May 24, 1966  B. KUMM  3,252,482
SOLENOID STRUCTURE
Filed June 17, 1963  2 Sheets-Sheet 1

INVENTOR.
BRENT KUMM
BY Hobbs & Easton
ATTORNEYS

May 24, 1966 — B. KUMM — 3,252,482
SOLENOID STRUCTURE

Filed June 17, 1963 — 2 Sheets-Sheet 2

INVENTOR.
BRENT KUMM
BY Hobbs & Easton
ATTORNEYS

United States Patent Office 3,252,482
Patented May 24, 1966

3,252,482
SOLENOID STRUCTURE
Brent Kumm, South Bend, Ind., assignor to Koontz-Wagner Electric Company, Inc., South Bend, Ind., a corporation of Indiana
Filed June 17, 1963, Ser. No. 288,132
6 Claims. (Cl. 137—625.48)

The present invention relates to solenoids and more particularly to a solenoid construction designed primarily for operating fluid control devices such as valves, regulators and the like.

Solenoid valves are extensively used to control the flow of a large variety of different kinds of fluids, including hydraulic fluids, air and other gases, highly inflammable and readily volatile liquid and gaseous fuels, and water containing many different types of chemicals in solutions, often of a highly corrosive nature. In the conventional solenoid valves, the valve element is usually operated by a plunger reciprocating in the electric coil and connected directly to the valve element by a stem or shaft extending through the valve housing into the fluid chamber of the valve. This conventional construction presents a persistent and difficult problem of sealing the electromagnetic coil from the fluid chamber to prevent the fluid passing through the valve from leaking around the stem and entering the coil and coil housing where it may react with the material forming the coil, resulting in serious damage and/or complete failure of the coil, or it may create a dangerous fire or explosive condition in or around the solenoid valve unit. Various types of seals and special intermediate chambers have been tried and often extensively used; however, these constructions almost invariably fail in time, thereby creating any one of the aforementioned hazardous conditions unless the failure is promptly discovered and corrected. It is therefore one of the principal objects of the present invention to provide an electromagnetically operated valve in which the electric coil is permanently and totally sealed from the valve element and fluid chamber and in which the electric coil functions effectively to capacity to operate the valve element.

Another primary object is to provide a solenoid enclosed in a ceramic or other nonconducting body which effectively protects the electric coil, yet which affords a good magnetic circuit for performing the desired operation.

Another object of the invention is to provide a solenoid valve in which the electromagnetic coil is positively sealed from the valve element with no opening of any kind between the fluid passages of the valve and the electrical coil.

Still another object of the invention is to provide a solenoid valve having an electrical coil fully embedded in a body of nonconducting material and sealed from the valve parts, and a core and a reciprocable plunger adapted to operate the valve parts and being separated and sealed from the coil.

A further object is to provide a valve of the aforesaid type in which a special construction is provided for transmitting the magnetic current from the coil to the armature or plunger operating the valve element while maintaining an effective seal between the coil and element and which can be readily adapted to various types of valves with very little alteration being required in the construction to obtain satisfactory or optimum performance of the electromagnet.

Another object of the invention is to provide a solenoid valve having a reliable and relatively simple construction for effectively sealing the solenoid from the fluid passages and chamber, and the parts of which can be readily fabricated and easily assembled with standard equipment and tools, and can thereafter be properly serviced without any special skills or training on the part of the operator.

Another object is to provide a solenoid which can be surrounded by inflammable liquids and gases and corrosive chemicals without creating a hazard or damaging the solenoid.

Additional objects and advantages of the invention will become apparent from the following description and accompanying drawings, wherein.

Figures 1, 2:
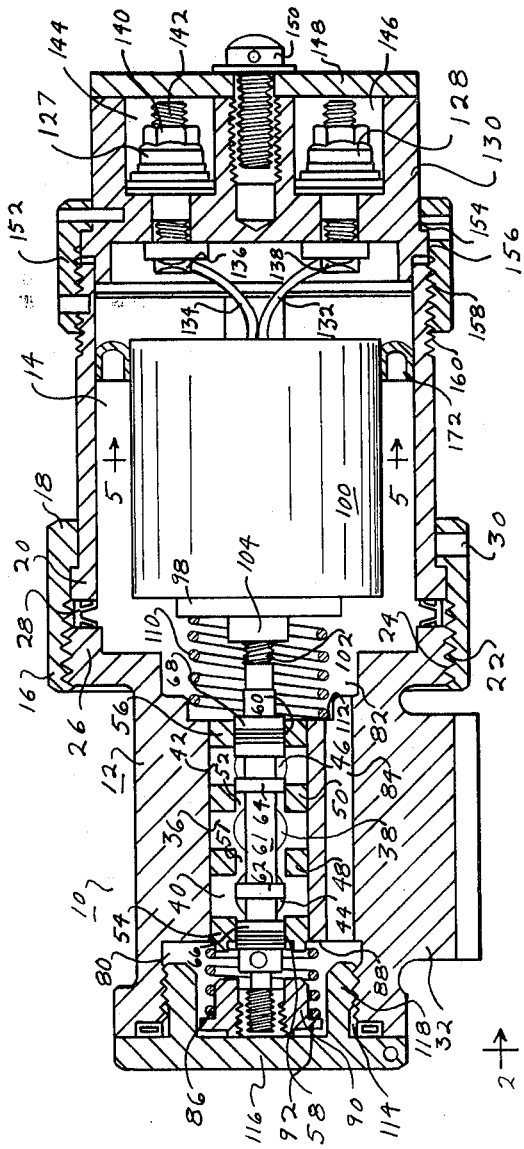
FIGURE 1 is an end elevational view of a solenoid valve embodying the present invention.
FIGURE 2 is a vertical cross sectional view of the solenoid valve shown in FIGURE 1, taken on line 2—2 of the latter figure.
Figure 3:
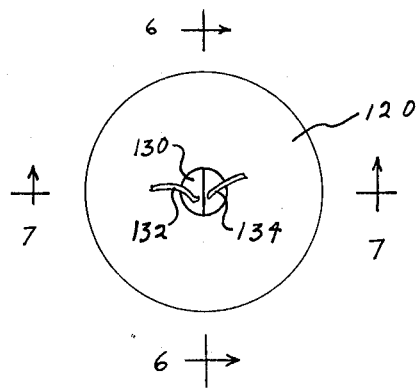
FIGURE 3 is an elevational view of one end of the solenoid mechanism shown in FIGURES 1 and 2.
Figure 4:
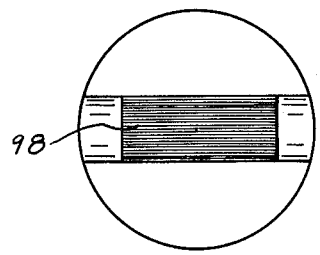
FIGURE 4 is an elevational view of the other end of the solenoid mechanism shown in the preceding figures.
Figure 5:
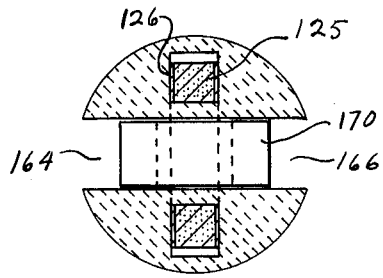
FIGURE 5 is a transverse cross sectional view of the solenoid mechanism incorporated in the valve structure shown in the preceding figures, the section being taken on line 5—5 of FIGURE 2.
Figure 6:
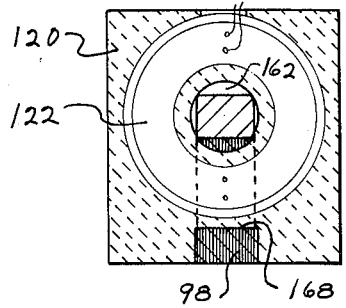
FIGURE 6 is a longitudinal cross sectional view of the solenoid mechanism shown in the preceding figures, the section being taken on line 6—6 of FIGURE 3.
Figure 7:
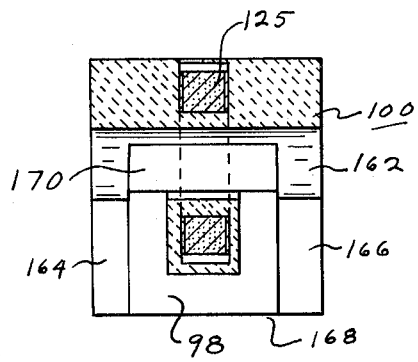
FIGURE 7 is another longitudinal cross sectional view of the solenoid mechanism shown in the preceding figures, the section being taken on line 7—7 of FIGURE 3.

Referring more specifically to the drawings and to FIGURES 1 and 2 in particular, numeral 10 designates generally the solenoid valve having the present invention incorporated therein, and consisting generally of a valve section 12 and an electromagnetic section 14, the two sections being joined together by an internally threaded ring 16 having an inwardly extending flange 18 for engaging radial rib 20 on section 14, and at the other end, screw threads 22 for engaging screw threads 24 on outwardly extending flange portion 26 of section 12. The two sections are maintained in fluid-tight relationship by a suitable gasket such as that shown at numeral 28, interposed between the two sections and adjacent the internal wall of ring 16. The ring is preferably held in fixed position after the two sections have been assembled and the ring tightened by a set screw 30 extending through flange 18 and engaging the external surface of section 14. The type of valve incorporated in the solenoid operated valve, as far as the present invention is concerned, is not important, the one shown being a three-way valve, which for the purpose of the present description may be considered conventional in construction and operation.

Valve section 12 consists of a housing 32, mounted on a base 34 and containing an inlet chamber 36 communicating with inlet passage 38 and two outlet chambers 40 and 42, communicating with outlet passages 44 and 46, respectively. Chambers 40 and 42 are separated from chamber 36 by annular walls 48 and 50, respectively, containing ports 51 and 52. The main valve chamber is sealed on either side of chambers 40 and 42 by annular walls 54 and 56, having openings 58 and 60, respectively, therethrough and in axial alignment with ports 51 and 52. The flow of fluid from inlet chamber 36 to chambers 40 and 42 and outlet passages 44 and 46 is controlled by a spool valve element 61 having lands 62 and 64 for controlling the flow of fluid through ports 51 and 52, respectively. The element also includes sealing lands 66 and 68 for preventing the fluid in chambers 40 and 42 from flowing longitudinally along the spool valve toward the ends thereof. In order to balance the valve element 61, chambers 80 and 82 at the left and right hand ends of the valve element, as viewed in FIGURE 2, connected by passage 84, are included to provide the same pressures on the external ends of lands 66 and 68 to thereby eliminate the effect of any leakage of fluid past one of the two sealing lands. The valve element is urged in the left-hand direction to connect chambers 36 and 40 by a spring 86 reacting at one end against the stationary wall 88 of chamber 80 and at the other end against cap 90, threadedly received on the end of element 61, and having a flange 92 thereon for receiving the adjacent end of spring 86.

The opposite end of element 61 is secured to an armature or plunger 98 of the solenoid mechanism 100 by a stem 102 threaded into boss 104 on the end of plunger 98 and a spring 110 in chamber 82 reacts between the plunger and the fixed wall 112 of the chamber. The valve chamber has an opening 114 at the end thereof to permit the valve element and springs to be inserted therein, the opening being closed by a cap 116 having an inwardly projecting center portion 118, threadedly secured to the internal wall of the opening.

Section 14 which houses the electromagnet 100 consists of cylindrically-shaped body 120 of ceramic or other firm non-electrical conducting material and a ring-shaped wire coil 122 fully embedded in the body on an axis transverse to the axis of the body. The wire coil 125 is wound on bobbin 126 and connected to contacts 127 and 128 in cap 130 by wires 132 and 134 extending from the coil and being joined to contacts 127 and 128 at inner ends 136 and 138 by soldering or any other suitable means for creating a satisfactory electrical connection. Lead wires extend through the walls of cap 130 and are secured to the contacts by nuts 140, threadedly received on ends 142 of each contact. The contacts are seated in recesses 144 and 146 of the cap, and are enclosed therein by a plate 148, held firmly in place on the cap by a screw 150, extending through the plate and being threadedly received in the cap. The cap is secured to shell 14 by a ring 152, having an internally extending flange 154 for engaging an externally extending ridge 156 on the cap, and screw threads 158 for engaging the screw threads 160 on the external surface of body 14.

Body 120 is preferably formed with coil 122 embedded therein with the wires projecting therefrom on the end opposite the valve. Other types of material than ceramic may be used in forming the coil, and the body may be formed in two separate halves and the coil inserted therein, and the two halves cemented or otherwise firmly joined together in a fluid-tight relation. The body 120 contains a transverse passage 162 extending axially through coil 122 in spaced relation to the internal surface of the coil. The body also contains two longitudinal grooves 164 and 166 on opposite sides thereof adjacent the valve end thereof and a transverse groove 168 in the corresponding end thereof connecting the two longitudinal grooves 164 and 166. These three grooves are preferably rectangular in cross section and are adapted to receive U-shaped plunger 98, which is adapted to reciprocate in grooves 164 and 166 and inwardly and outwardly in groove 168. Plunger 98 is constructed of laminated metal sheet material, layers of which are secured together to form a rigid structure. Disposed in opening 162 is a bar 170 extending substantially through said opening and terminating at the ends of U-shaped plunger 98. The bar is preferably constructed of laminated sheet metal material and, together with plunger 98, forms a magnetic circuit completely encircling the magnetic circuit from the center of coil 122 around the external surface thereof for attracting the plunger toward the bar and holding it in firm contact therewith when the electromagnet is energized to operate the valve.

After the valve, including the electromagnet, has been assembled in the manner shown in FIGURE 2, energization of solenoid mechanism 100 causes a magnetic field to be created in bar 170 and plunger 98, causing the plunger to move to the right, as viewed in FIGURE 2, thus operating valve element 61, the magnetic field holding the inner ends of plunger 98 firmly against the bar as long as the electromagnet is energized. Movement of the plunger to this position shifts the valve element so that land 62 is positioned in port 51 and land 64 is to the right of port 52, thereby connecting chambers 36 and 42 for the flow of fluid from inlet passage 38 to outlet passage 46. When the solenoid is deenergized, spring 86, which is of greater strength than spring 110, returns the valve element 61 to the position shown in FIGURE 2, with land 64 closing port 52 and land 62 to the left of port 51, thereby connecting chambers 36 and 40 for flow of fluid from inlet passage 38 to outlet passage 44.

It is seen from the foregoing construction that the fluid in the valve portion is free to flow in and around body 120 of electromaget 100 and is prevented from passing from the right-hand end of the chamber by sealing ring 172. Since body 120 is impervious to fluids and since the wires of coil 125 are on the external side of seal 172, the coil is completely isolated and sealed from the fluids passing through the valve. This construction renders the solenoid safe for use in conjunction with inflammable and corrosive fluids.

While the present solenoid is particularly adapted for use in conjunction with valves, it can be used to an advantage in many other applications and in many different types of devices, the valve embodiment disclosed and described herein being merely for the purpose of illustrating one particular application. Another advantage of the present solenoid construction is that the electrical coil is enclosed in an electrical nonconducting material, thus eliminating the losses from circulating currents. This loss, particularly in high frequency, creates a major heating problem in conventional solenoids. In a further refinement, the U-shaped plunger 98 and bar 170 may be interchanged in position, thus using the lighter bar as the movable member.

While only one embodiment of the invention has been described in detail herein, various changes and modifications may be made to satisfy requirements without departing from the scope of the invention.

I claim:

1. In a solenoid operated valve having a valve body having a fluid inlet passage, two fluid outlet passages, a spool valve element controlling the flow of fluid from said inlet passage to said outlet passages, resilient means urging said element to its closed position, and walls forming a cylindrical chamber at one end of said valve element communicating with the passages in said valve: a solenoid mechanism in said chamber comprising a cylindrically-shaped body with the axis thereof parallel with said valve element having a transverse opening therethrough, and two longitudinal grooves therein connected to said opening and extending to the end of said body adjacent the valve element, a ring-shaped coil fully embedded in said body around said transverse opening, electrical leads connected to said coil and extending from said body at the end opposite said valve element, a laminated metal bar in said opening, a reciprocable U-shaped plunger of laminated metal having its two arms disposed in said grooves, a stem connecting the bottom of said U-shaped plunger to said valve element, and a sealing means between said body and the internal surface of said walls at the end of the body opposite the valve element.

2. In a solenoid operated valve having a valve body, a valve element controlling the flow of fluid through said valve, and walls forming a cylindrical chamber at one end of said valve element communicating with the passages in said valve: a solenoid mechanism in said chamber comprising a body with a transverse opening therein and two longitudinal grooves therein connected to said opening and extending to the end of said body adjacent the valve element, a ring-shaped coil fully embedded in said body around said transverse opening, a bar of metal in said opening, a U-shaped plunger of metal having its two arms disposed in said grooves, a means connecting the bottom of said U-shaped plunger to said valve element, and a sealing means between said body and the internal surface of said walls at the end of the body opposite the valve element.

3. In a solenoid operated valve having a valve body, and a valve element controlling the flow of fluid through said valve: a solenoid comprising, a cylindrically-shaped body with the axis thereof parallel with said valve element having a transverse opening therein and two longitudinal grooves therein connected to said opening and extending to the end of said body adjacent the valve element, a ring-shaped coil fully embedded in said body around said transverse opening, electrical leads connected to said coil and extending from said body at the end opposite said valve element, a laminated metal bar in said opening, a reciprocable U-shaped plunger of metal having its two arms disposed in said grooves, and a stem connecting the bottom of said U-shaped plunger to said valve element.

4. A solenoid construction, comprising a cylindrically-shaped body having a transverse opening therethrough and two longitudinal grooves therein connected to said opening and extending to one end of said body, a ring-shaped coil fully embedded in said body around said transverse opening, electrical leads connected to said coil and extending from said body at the end opposite said grooves, a laminated metal bar in said opening, and a reciprocable U-shaped plunger of laminated metal having its two arms disposed in said grooves.

5. A solenoid construction, comprising a body having a transverse opening therein and two longitudinal grooves therein connected to said opening and extending to one end of said body, a coil fully embedded in said body around said transverse opening, a bar of metal in said opening, and a reciprocable U-shaped plunger of metal having its two arms disposed in said grooves.

6. A solenoid construction, comprising a body having a transverse opening therein and two longitudinal grooves therein connected to said opening and extending to one end of said body, a coil fully embedded in said body around said transverse opening, a member of metal in said opening, a plunger member of metal disposed near said one end of said body, and arms disposed in said grooves and connected to one of said members.

References Cited by the Examiner

UNITED STATES PATENTS

| 1,451,525 | 4/1923 | Bouton | 317—165 |
| 1,892,917 | 1/1933 | Walker | 251—140 |
| 2,675,022 | 4/1954 | Bohn | 251—141 X |
| 2,756,371 | 7/1956 | Holmes | 317—165 |

FOREIGN PATENTS

| 790,637 | 9/1935 | France. |
| 467,340 | 6/1937 | Great Britain. |

OTHER REFERENCES

Bell Laboratories Record, volume 38, No. 9, September 1960 (page 326 relied on).

M. CARY NELSON, *Primary Examiner.*

MARTIN P. SCHWADRON, *Examiner.*

A. JAFFE, E. FEIN, *Assistant Examiners.*